United States Patent
Park et al.

(10) Patent No.: US 9,651,088 B2
(45) Date of Patent: May 16, 2017

(54) BALL RETAINER, SLIDE APPARATUS COMPRISING SAME AND MOLD FOR MANUFACTURING SAME

(71) Applicant: SEGOS CO., LTD., Incheon (KR)

(72) Inventors: Yoon Sig Park, Seoul (KR); Hyun Ho Cha, Goyang-si (KR)

(73) Assignees: Yoon Sig Park, Seoul (KR); SEGOS CO., LTD., Namdong-Gu, Incheon (KR)

( * ) Notice: Subject to any disclaimer, the term of this patent is extended or adjusted under 35 U.S.C. 154(b) by 0 days.

(21) Appl. No.: 14/890,563

(22) PCT Filed: Jun. 11, 2013

(86) PCT No.: PCT/KR2013/005107
§ 371 (c)(1),
(2) Date: Nov. 11, 2015

(87) PCT Pub. No.: WO2014/200125
PCT Pub. Date: Dec. 18, 2014

(65) Prior Publication Data
US 2016/0084309 A1 Mar. 24, 2016

(51) Int. Cl.
*A47B 88/04* (2006.01)
*F16C 33/38* (2006.01)
(Continued)

(52) U.S. Cl.
CPC .......... *F16C 33/3856* (2013.01); *A47B 88/10* (2013.01); *A47B 88/14* (2013.01);
(Continued)

(58) Field of Classification Search
CPC ..... A47B 88/14; A47B 88/10; A47B 88/0466; B29C 45/26; B29L 2031/00; F16C 33/38;
(Continued)

(56) References Cited

U.S. PATENT DOCUMENTS 5,775,788 A * 7/1998 Sasse .................... A47B 88/14
312/334.11
7,104,692 B1 * 9/2006 Lu .......................... F16C 33/40
384/49
(Continued)

FOREIGN PATENT DOCUMENTS

KR  1020080040037   5/2008
KR  1020090002515   1/2009
(Continued)

OTHER PUBLICATIONS

International Search Report—PCT/KR2013/005107 dated Jan. 27, 2014.

*Primary Examiner* — Daniel Rohrhoff
(74) *Attorney, Agent, or Firm* — Cantor Colburn LLP

(57) ABSTRACT

A ball retainer for a slide apparatus and a mold for manufacturing the same. The ball retainer includes, in a width direction, a first extension part and a second extension part that are extended from a center line, forming a pre-determined angle with each other, in a length direction, a body part formed in the center, and a pair of holding parts. Each holding part is respectively formed at each end of the body part. Each holding part includes a plurality of ball insertion grooves for inserting balls that are spaced apart in the length direction. Expansion parts each having an expanding cross-sectional area are respectively formed at both sides in the length direction of the first extension part and the second extension part.

12 Claims, 14 Drawing Sheets

(51) Int. Cl.
*A47B 88/14* (2006.01)
*B29C 45/26* (2006.01)
*F16C 29/00* (2006.01)
*A47B 88/10* (2006.01)
*F16C 29/04* (2006.01)
*F16C 33/54* (2006.01)
*B29L 31/04* (2006.01)
*A47B 88/16* (2006.01)

(52) U.S. Cl.
CPC ............ *B29C 45/26* (2013.01); *F16C 29/005* (2013.01); *F16C 29/04* (2013.01); *A47B 88/16* (2013.01); *A47B 2210/0035* (2013.01); *B29L 2031/04* (2013.01); *F16C 29/048* (2013.01); *F16C 33/543* (2013.01); *F16C 2314/00* (2013.01)

(58) Field of Classification Search
CPC .. F16C 33/3856; F16C 33/3837; F16C 29/04; F16C 29/048
See application file for complete search history.

(56) References Cited

U.S. PATENT DOCUMENTS

| | | | | |
|---|---|---|---|---|
| 9,427,084 | B2* | 8/2016 | Park | A47B 88/14 |
| 2009/0074334 | A1* | 3/2009 | Juan | A47B 88/10 384/19 |
| 2011/0194791 | A1* | 8/2011 | Jahrling | A47B 88/10 384/26 |
| 2011/0241515 | A1* | 10/2011 | Park | A47B 88/10 312/408 |
| 2014/0079346 | A1* | 3/2014 | Chung | F16C 29/04 384/18 |
| 2014/0348447 | A1* | 11/2014 | Foster | A47B 88/10 384/13 |
| 2015/0043842 | A1* | 2/2015 | Stijns | A47B 88/10 384/18 |

FOREIGN PATENT DOCUMENTS

KR 1020100079712 7/2010
KR 1020120040058 4/2012

* cited by examiner

BALL RETAINER, SLIDE APPARATUS COMPRISING SAME AND MOLD FOR MANUFACTURING SAME

TECHNICAL FIELD

The present invention relates to a ball retainer of a slide apparatus, a slide apparatus including the same, and a mold for fabricating the same ball retainer.

BACKGROUND ART

As is known in the art, there are a variety of examples of slide apparatuses. FIG. 1 is a vertical cross-sectional view illustrating a slide apparatus disclosed in Korean Laid-Open Patent Publication No. 10-2010-0079712 filed by the applicant. A slide 1 includes a fixed rail 2, a first movable rail 3, a second movable rail 4, and a ball retainer 100. The ball retainer 100 is situated between the fixed rail 2 and the first movable and between the first movable rail 3 and the second movable rail 4. A plurality of balls 9 are accommodated in the ball retainer 100. The fixed rail 2 is fixed to a fixed part, such as a desk, a cabinet, or the like, and the second movable rail 4 is fixed to a movable part, such as a drawer. The first movable rail 3 slides with respect to the fixed rail 2. Since the second movable rail 4 slides with respect to the first movable rail 3, the movable part can be retracted into and withdrawn from the fixed part. The plurality of balls 9 positioned between a raceway 8 of the second movable rail 4 and a raceway 7 of the first movable rail 3 and between a raceway 5 of the fixed rail and a raceway 6 of the first movable rail 3 roll when the second movable rail 4 slides with respect to the first movable rail 3 and the first movable rail 3 slides with respect to the fixed rail. In this manner, the plurality of balls 9 reduce the friction between rails during the sliding of the first movable rail 3 and the second movable rail 4 while supporting the load of the movable part. The ball retainer 100 serves to maintain the distances between the balls 9 such that the load can be properly transferred between the rails.

Typically, the balls 9 accommodated in the ball retainer 100 are formed of a metal in order to support the load of the drawer. The body of the ball retainer 100 is formed of a metal or a plastic having a suitable strength.

In the process of withdrawing and retracting the drawer, vibrations and force are applied to the drawer. Since the drawer to which the slide apparatus 1 is mounted is generally fabricated of wood, such vibrations and force may form dust or may cause wood chips to be detached from the drawer and the desk. In this case, when dust or the like falls on the raceways 5, 6, 7, and 8 of the rails 2, 3, and 4, the rolling operation of the balls 9 may be hindered. In other words, when dust or the like is accumulated on portions of the raceways 5, 6, 7, and 8 on which the balls 9 move, dust or the like sticks to the balls 9. This consequently hinders the rolling movement of the balls 9, whereby the balls 9 do not smoothly roll. When the drawer is withdrawn or retracted, noise occurs, thereby causing discomfort to a user.

In addition, lubricant such as grease is generally applied on the raceways 5, 6, 7, and 8 in order to allow the balls 9 to smoothly roll and prevent the raceways 5, 6, 7, and 8 from being abraded. However, when the lubricant is contaminated by impurities, such as dust, that have arrived at the raceways 5, 6, 7, and 8, the endurance of the rails 2, 3, and 4 is rapidly reduced. In addition, when the slide apparatus is repeatedly withdrawn and retracted, the lubricant is pushed by the balls 9, thereby leaking from the raceways 5, 6, 7, and 8. Consequently, the other portions of the rails 2, 3, and 4 are contaminated by the lubricant, and the amount of the lubricant performing a lubrication function becomes insufficient, such that the balls 9 or the raceways 5, 6, 7, and 8 are abraded. In order to overcome this problem, in the related art, lubricant is periodically applied on the raceways 5, 6, 7, and 8.

Furthermore, when wood chips, which are larger than dust, fall on the raceways 5, 6, 7, and 8, the wood chips may be caught between the balls 9 and the raceways 5, 6, 7, and 8, whereby the slide apparatus 1 may become inoperative.

In addition, in the slide apparatus 1, when the first movable rail 240 and the second movable rail 270 arrive at maximum withdrawal positions and maximum retraction positions during the withdrawal and retraction of the drawer, some balls 9 positioned at the leading end in the direction in which the first movable rail 240 and the second movable rail 270 move are caught by stoppers (not shown) provided on the fixed rail 210 and the first movable rail 240, whereby the first movable rail 240 and the second movable rail 270 move no more. When the drawer is manipulated with an excessively large amount of force during the withdrawal and retraction of the drawer, a large impact is applied to the ball retainer 100 in the maximum withdrawal point and the maximum retraction point of the drawer. As the ball retainer 100 has the shape of a thin plate, such an impact may cause the ball retainer 100 to move over the balls 9, such that the balls 9 are dislodged from the ball retainer 100, which is problematic.

Thus, it is required to provide a means for removing dust such that the operation of the slide apparatus is not influenced by dust occurring from the drawer in which the slide apparatus is disposed and protecting lubricant that enables the slide apparatus to smoothly roll and prevents the raceways from being abraded. In addition, there is great necessity for the ball retainer 100 able to reliably retain the balls 9 such that the balls 9 are not dislodged from the ball retainer 100 when a large impact is applied to the ball retainer due to an excessively large amount of force acting on the drawer during the withdrawal and retraction of the drawer.

DISCLOSURE

Technical Problem

Accordingly, the present invention has been made keeping in mind the above problems occurring in the related art, and the present invention is intended to propose a light plastic ball retainer and a slide apparatus including the same able to improve the sensation of use of the slide apparatus by preventing lubricant from being contaminated and leaking and to extend the longevity of the slide apparatus.

The present invention is also intended to propose a ball retainer and a slide apparatus able to reliably retain balls such that the balls are not dislodged from the ball retainer even if a user withdraws or retracts the slide apparatus using an excessive amount of force.

The present invention is also intended to propose a mold for fabricating the ball retainer having the above-described functions.

Technical Solution

In order to achieve the above object, according to one aspect of the present invention, there is provided a ball retainer including: a first extension and a second extension extending from a centerline in transverse directions, forming a predetermined angle therebetween; a body section formed in a central portion in a longitudinal direction, the body section having; and a pair of retaining sections formed on both ends of the body section, each of the retaining sections having a plurality of ball accommodation recesses in which balls are accommodated, the ball accommodation recesses being spaced apart in the longitudinal direction. Each of the first extension and the second extension has expanded sections on both sides thereof in the longitudinal direction, a cross-sectional area of each of the expanded section being greater than a cross-sectional area of a corresponding one of the first extension and the second extension.

The plurality of ball accommodation recesses in the first extension may alternate with the plurality of ball accommodation recesses in the second extension with respect to the longitudinal direction.

The present invention is also intended to provide a slide apparatus including: a fixed rail fixed to a fixed part, and having a first raceway; a first movable rail having a second raceway formed in a position corresponding to the first raceway, being slidably coupled to the fixed rail, and having a third raceway; a second movable rail fixed to a movable part, having a fourth raceway formed in a position corresponding to the third raceway, and being slidably coupled to the first movable rail; a plurality of rolling members interposed between the first raceway and the second raceway and between the third raceway and the fourth raceway such that the plurality of rolling members can roll; and a ball retainer interposed between the first raceway and the second raceway and between the third raceway and the fourth raceway to maintain distances between the rolling members.

The ball retainer may include: a first extension and a second extension extending from a centerline in transverse directions, forming a predetermined angle therebetween; a body section formed in a central portion in a longitudinal direction, the body section having; and a pair of retaining sections formed on both ends of the body section, each of the retaining sections having a plurality of ball accommodation recesses in which balls are accommodated, the ball accommodation recesses being spaced apart in the longitudinal direction. Each of the first extension and the second extension has expanded sections on both sides thereof in the longitudinal direction, a cross-sectional area of each of the expanded section being greater than a cross-sectional area of a corresponding one of the first extension and the second extension.

The present invention is also intended to provide a mold for fabricating the above-mentioned ball retainer. The mold includes: a first mold and a second mold, in each of which an accommodation space having a predetermined shape is formed; a pair of first pattern sections accommodated the accommodation spaces to form a cavity having a shape corresponding to the retaining sections and the body section; a second pattern section interposed between the pair of first pattern sections in the accommodation space to form a cavity having a shape corresponding to an additional length portion of the body section; and a pair of side cores accommodated in both ends of the first pattern sections of the accommodation space to occupy a remaining area in the accommodation space, except for areas occupied by the first pattern sections and the second pattern section, thereby fixing the first pattern sections and the second pattern section so as not to move.

Advantageous Effects

In the ball retainer according to the embodiment of the present invention, the extensions remove impurities such as dust entering the raceways out of the movement range of the rolling members, such that the rolling members can smoothly roll. It is therefore possible to improve the sensation of use of the slide apparatus during withdrawal and retraction of the slide apparatus and extend the longevity of the slide apparatus.

In addition, in the ball retainer according to the embodiment of the present invention, the expanded sections formed on both ends of the ball retainer in the longitudinal direction prevent the ball retainer from moving over the rolling members even if the slide apparatus is withdrawn or retracted using an excessive amount of force.

Furthermore, in the ball retainer according to the embodiment of the present invention, the ball accommodation recesses in the first extension alternate with the ball accommodation recesses in the first extension in the longitudinal direction, whereby load can be equally distributed to balls accommodated in the ball retainer.

In addition, in the ball retainer according to the embodiment of the present invention, various types of ball retainers having different lengths of body sections can be fabricated using a single mold. It is therefore possible to simplify the fabrication of the ball retainers and reduce the fabrication costs of the mold.

DESCRIPTION OF DRAWINGS

FIG. 5 is a left-side elevation view of FIG. 4a;

MODE FOR INVENTION

Figure 1:
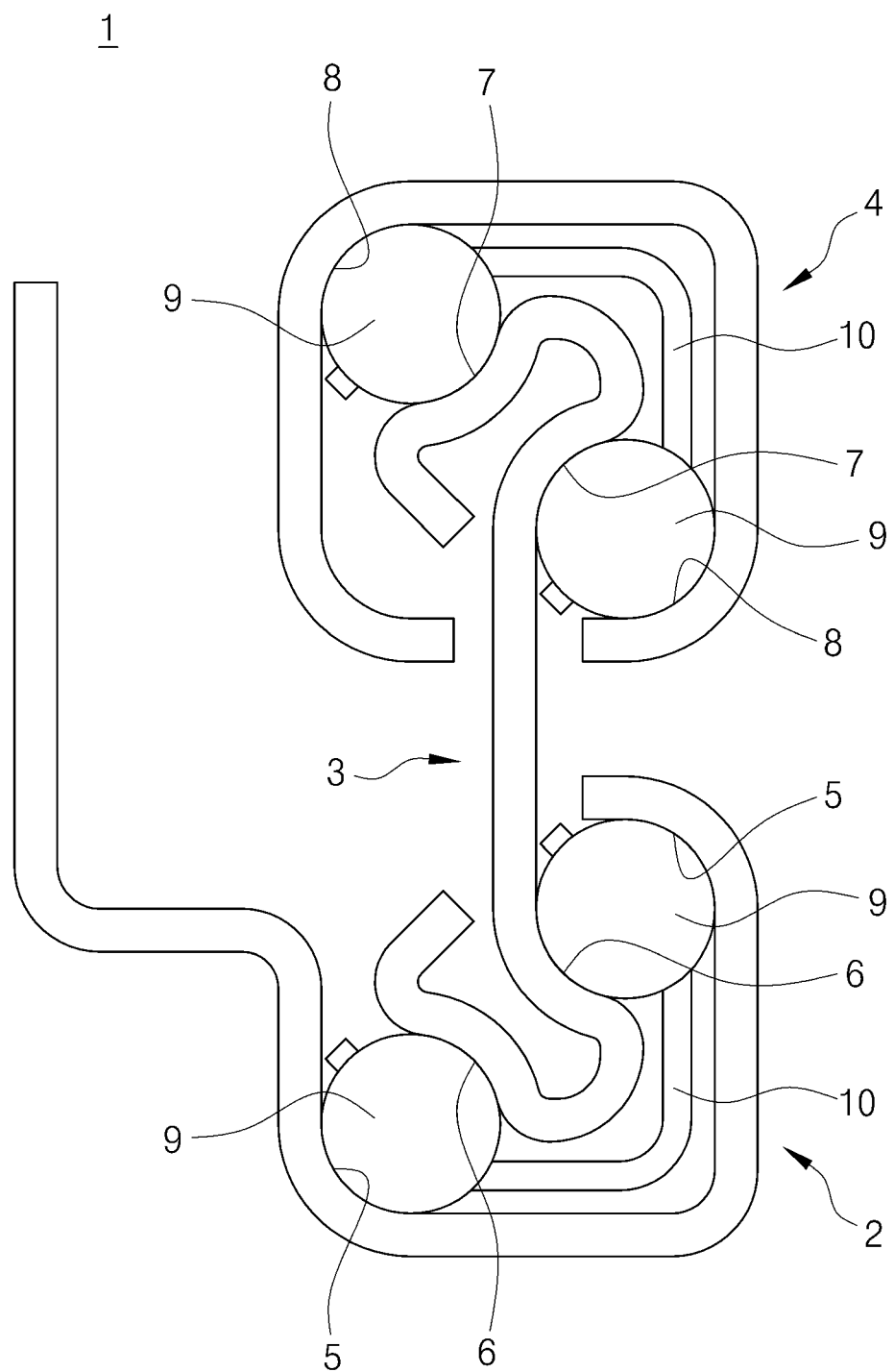
FIG. 1 is a vertical cross-sectional view illustrating a slide apparatus of the related art.

Reference will now be made in greater detail to exemplary embodiments of the present invention, examples of which are illustrated in the accompanying drawings. Wherever possible, the same reference numerals will be used throughout the drawings and the description to refer to the same or like parts. In the following description of the present invention, detailed descriptions of known functions and components incorporated herein will be omitted to avoid making the subject matter of the present invention unclear.

Figure 2:
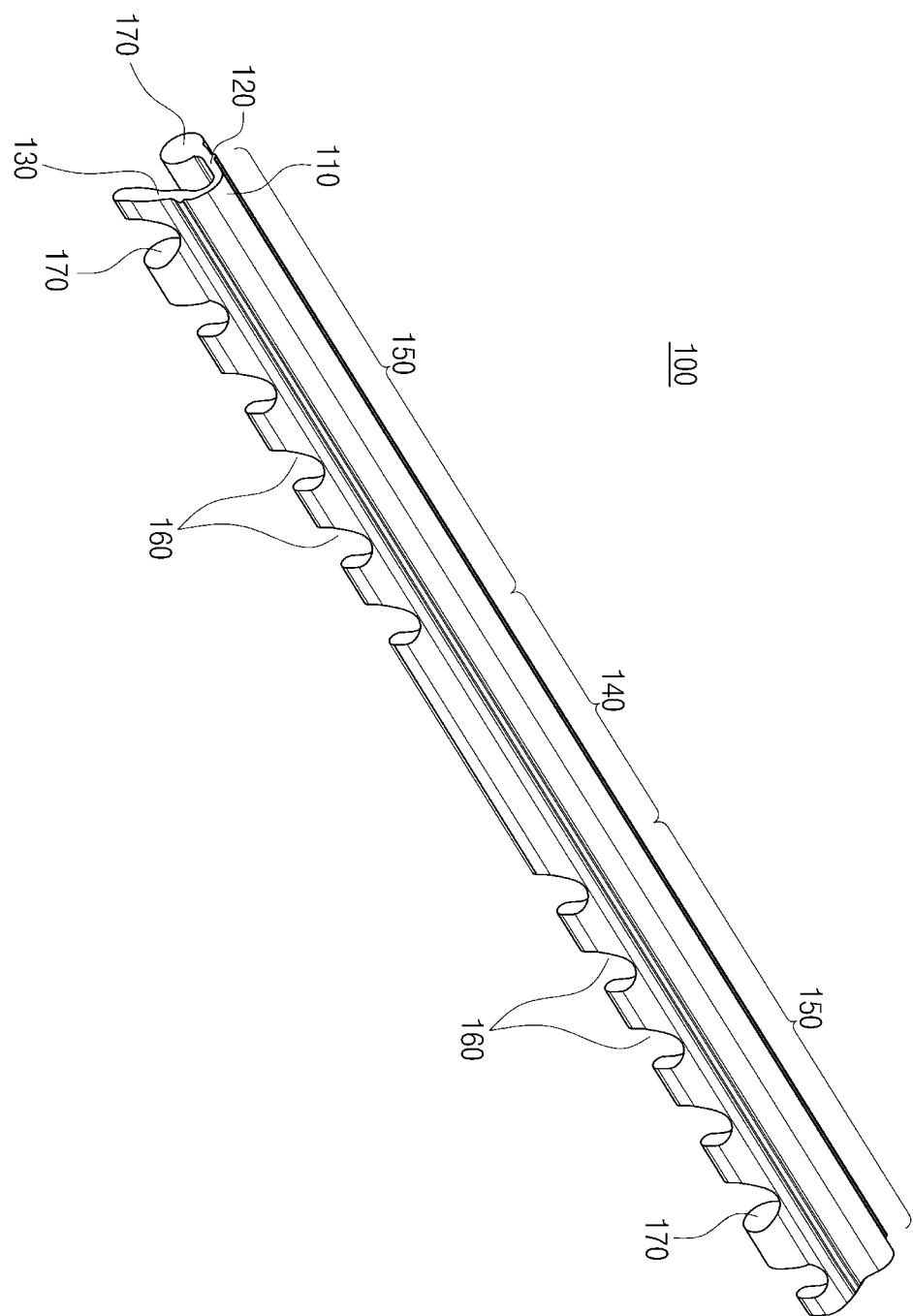
FIG. 2 is a perspective view illustrating a ball retainer according to an embodiment of the present invention.
Figure 3:
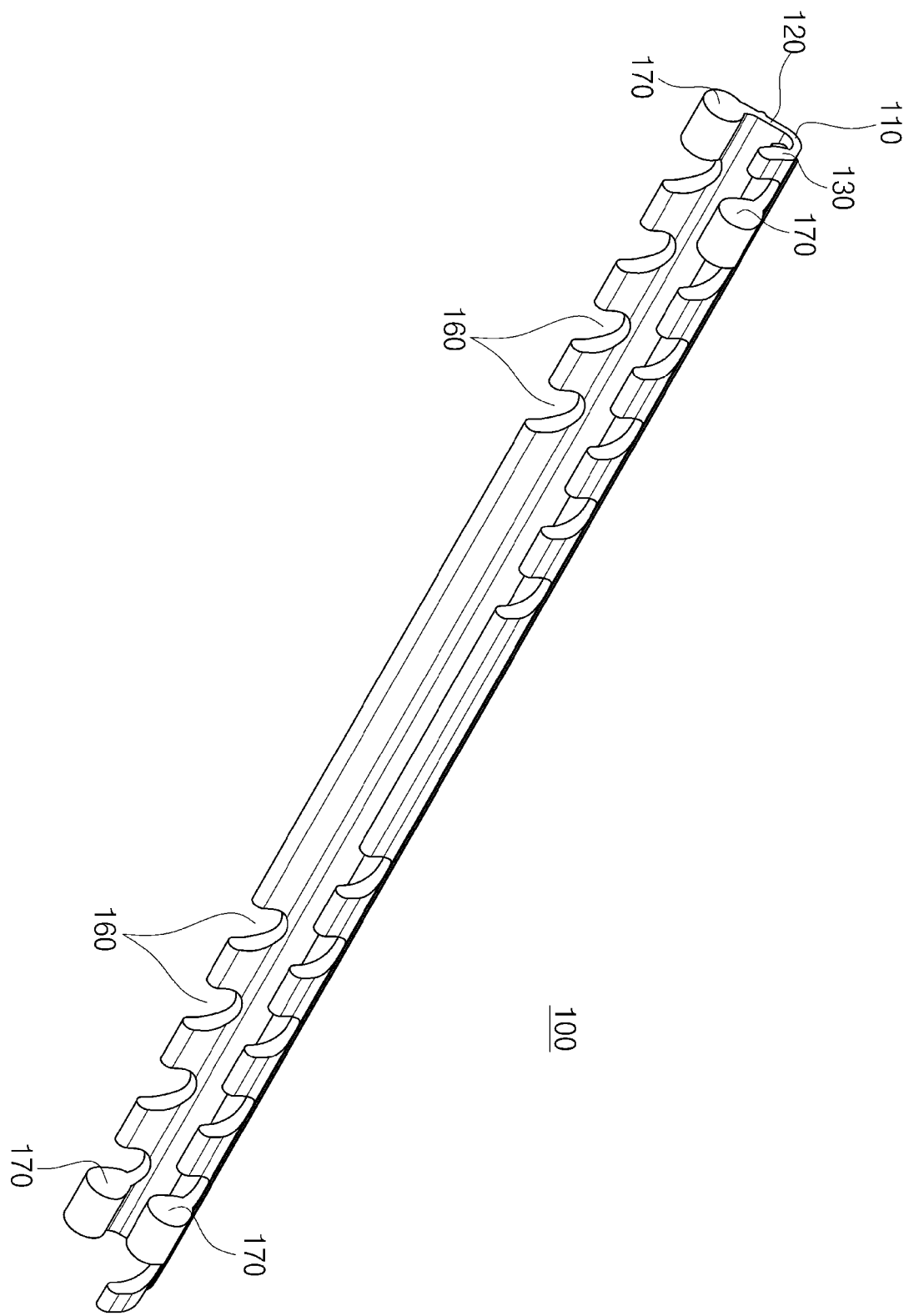
FIG. 3 is a perspective view of the ball retainer illustrated in FIG. 2, viewed from a different direction.
Figure 4A:
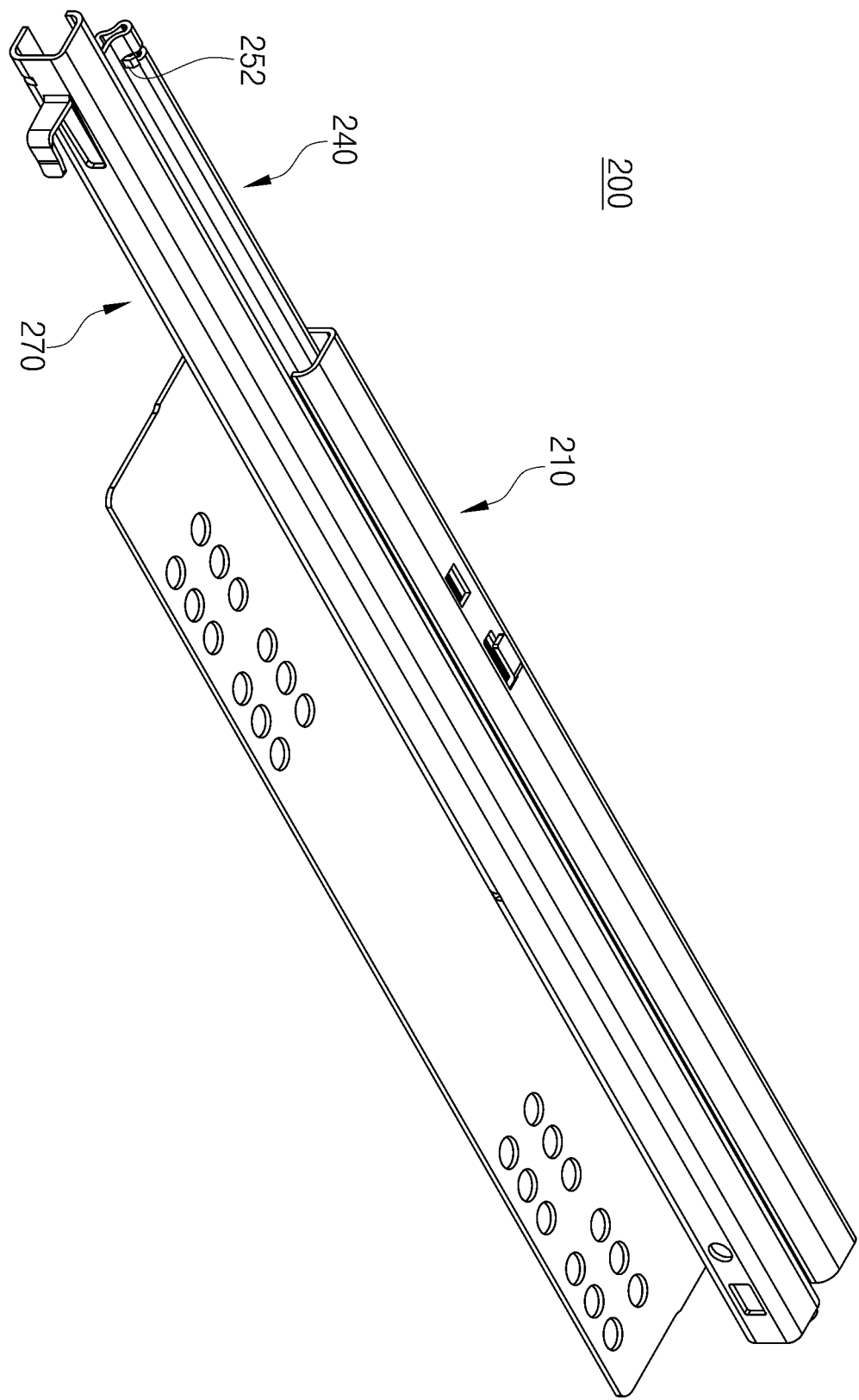
FIGS. 4a and 4b are views illustrating the retraction and withdrawal positions of a slide apparatus on which the ball retainer according to the embodiment of the present invention is mounted.
Figure 4B:
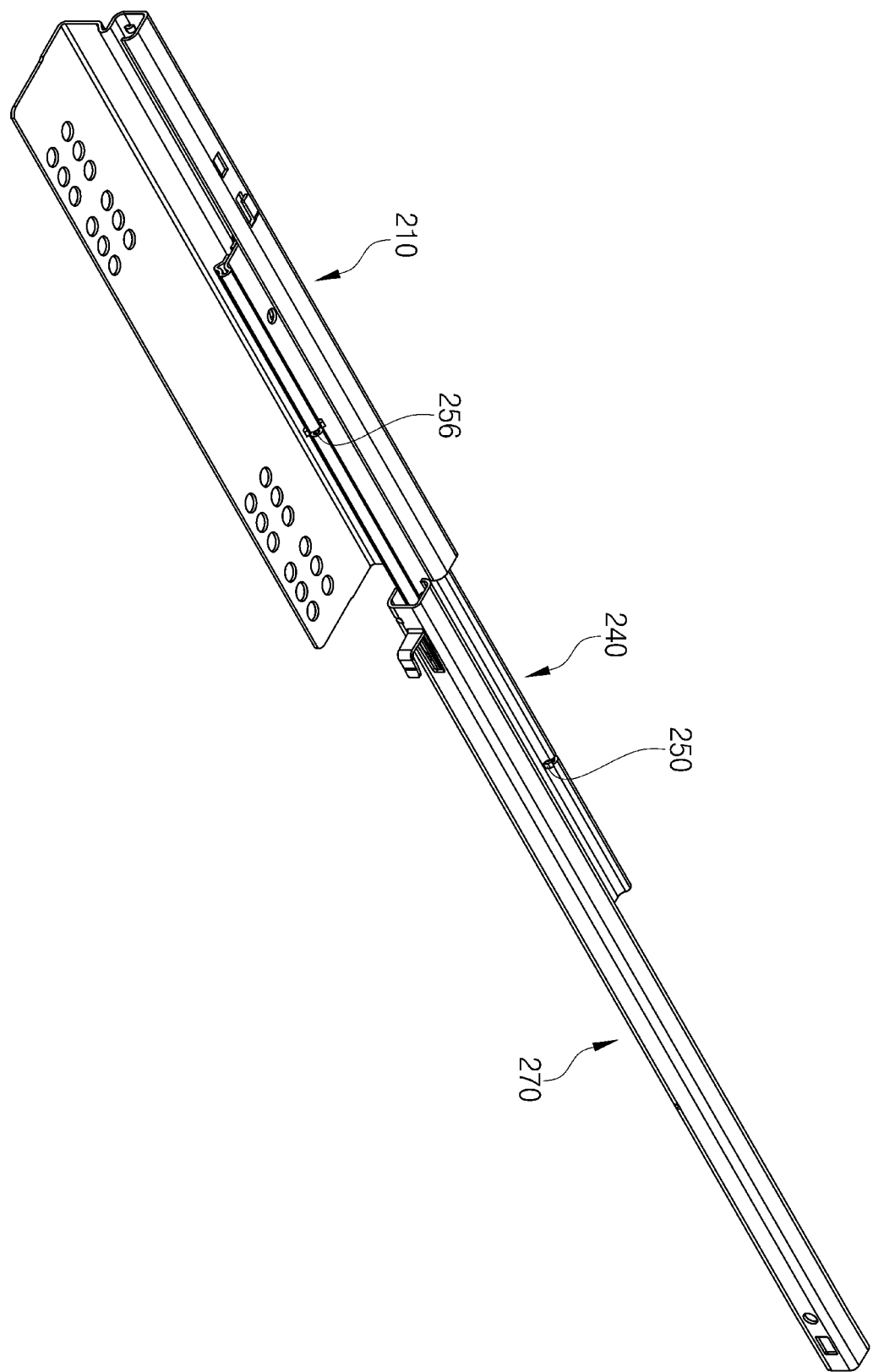
Figure 5:
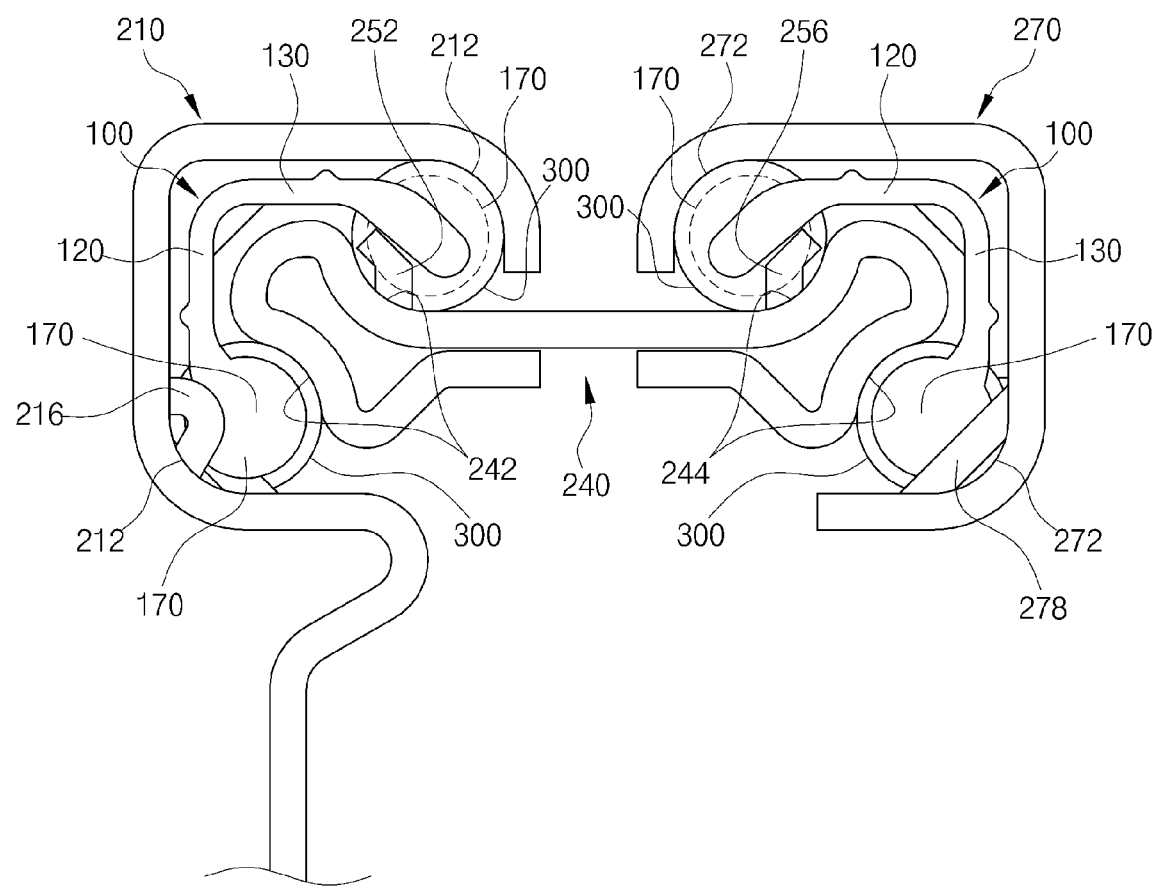
Figure 6:
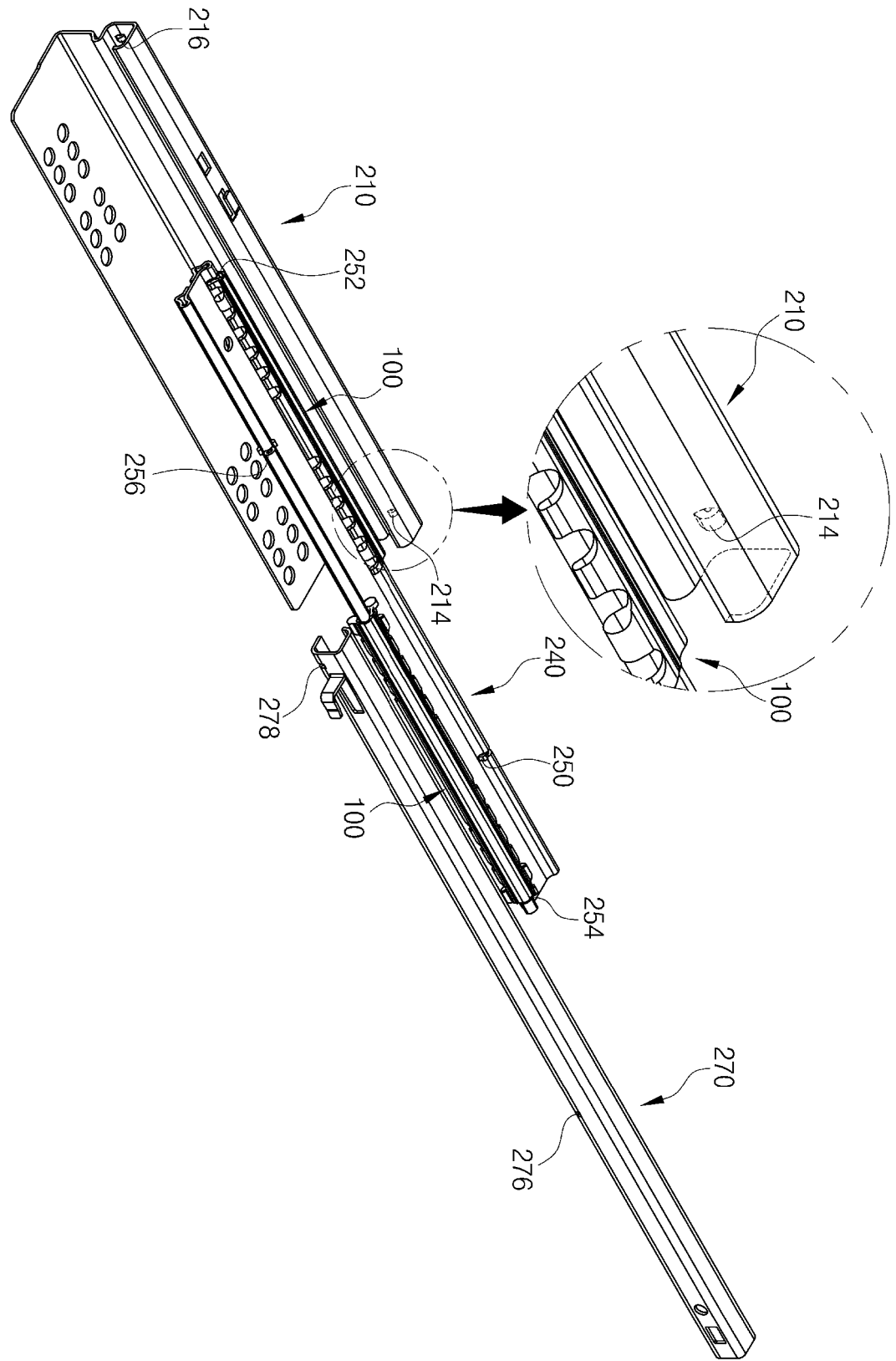
FIG. 6 is an exploded perspective view of FIG. 4b.

FIG. 2 is a perspective view illustrating a ball retainer according to an embodiment of the present invention, FIG. 3 is a perspective view of the ball retainer illustrated in FIG. 2, viewed from a different direction, FIGS. 4a and 4b are views illustrating the retraction and withdrawal positions of a slide apparatus on which the ball retainer according to the embodiment of the present invention is mounted, FIG. 5 is a left-side elevation view of FIG. 4a, and FIG. 6 is an exploded perspective view of FIG. 4b. Hereinafter, the ball retainer 100 will be described together with the slide apparatus as being included in the slide apparatus.

Referring to FIG. 4a to FIG. 6, the slide apparatus 200 in which the ball retainer 100 according to the embodiment of the present invention is disposed includes a fixed rail 210, a first movable rail 240, a second movable rail 270, a plurality of rolling members 300, and the ball retainer 100. The fixed rail 210 is fixed to a fixed part (not shown), such as a desk, a cabinet, or the like, and the second movable rail 270 is fixed to a movable part (not shown), such as a drawer. The second rail 210 has a first raceway 212. The first movable rail 240 has a second raceway 242 formed on a position of one side thereof corresponding to the first raceway 212 and a third raceway 244 formed on a position of the other side thereof. The first movable rail 240 is slidably coupled to the fixed rail 210. The second movable rail 270 has a fourth raceway 272 on a position thereof corresponding to the third raceway 244. The second movable rail 270 is slidably coupled to the first movable rail 240. The plurality of rolling members 300 are rollably interposed between the first raceway 212 and the second raceway 242 and between the third raceway 244 and the fourth raceway 272. The ball retainer 100 is interposed between the first raceway 212 and the second raceway 242 and between the third raceway 244 and the fourth raceway 272, thereby maintaining the distances between the rolling members 300.

One side of the first movable rail 240 is slidably coupled to the fixed rail 210 and the other side of the first movable rail 240 is slidably coupled to the second movable rail 270, thereby connecting the fixed rail 210 and the second movable rail 270. As illustrated in FIGS. 4a and 4b, the first movable rail 240 slides with respect to the fixed rail 210 and the second movable rail 270 slides with respect to the first movable rail 240, whereby the movable part can be withdrawn and retracted with respect to the fixed part. In the following description, the direction in which the first movable rail 240 is withdrawn from the fixed rail 210 is referred to as "front". In addition, the direction opposite to the front, i.e. the direction in which the first movable rail 240 is retracted into the fixed rail 210, is referred to as "rear". In addition, operating the slide apparatus means withdrawing and retracting the first movable rail 240 with respect to the fixed rail 210 and/or withdrawing and retracting the second movable rail 270 with respect to the first movable rail 240.

The second raceway 242 and the third raceway 244 are formed on both side surfaces of the first movable rail 240, extending in the longitudinal direction. The first raceway 212 is formed on the inner surface of the fixed rail 210, in the position corresponding to the second raceway 242. The fourth raceway 272 is formed on the inner surface of the second movable rail 270, in the position corresponding to the third raceway 244. The first raceway 212 and the second raceway 242 are disposed to face each other, thereby forming a set of tracks on which the rolling members 300 can roll. The third raceway 244 and the fourth raceway 272 form a set of tracks in the same manner. The rolling members 300 are rollably interposed between the first raceway 212 and the second raceway 22 and between the third raceway 244 and the fourth raceway 272.

The rolling members 300 are disposed on the raceways 212 and 242 between the fixed rail 210 and the first movable rail 240 and on the raceways 244 and 272 between the first movable rail 240 and the second movable rail 270 such that they are spaced apart from each other in the longitudinal direction. The rolling members 300 are shaped such that they can roll. The rolling members 300 roll along the first raceway 212 and the second raceway 242 when the first movable rail 240 slides on the fixed rail 210 and roll along the third raceway 244 and the fourth raceway 272 when the second movable rail 270 slides on the first movable rail 240, thereby reducing the friction between the first movable rail 240 and the fixed rail 270 and between the first movable rail 240 and the second movable rail 270. Although the rolling members 300 are illustrated in the shape of balls in the present embodiment, examples of the rolling members 300 may include any rolling means able to perform rolling movement. That is, the rolling members 300 may be balls, rollers, or the like that can perform rolling movement.

Further, in the present embodiment, the slide apparatus has a three-part overlapping structure in which the fixed rail 210, the first movable rail 240, and the second movable rail 270 are disposed, the first movable rail 240 can be withdrawn from the fixed rail 210, and the second movable rail 270 can be withdrawn from the first movable rail 240. As required, the slide apparatus may be modified into a variety of other structures, such as a two-part overlapping structure in which one movable rail can be withdrawn from the fixed rail or a four-part overlapping structure in which another third movable rail can be withdrawn from the second movable rail.

The ball retainer 100 is disposed between the inner surface of the fixed rail 210 and one outer surface of the first movable rail 240 and between the other outer surface of the first movable rail 240 and the inner surface of the second movable rail 270. The ball retainer 100 maintains the distances between the plurality of rolling members 300 interposed between the first raceway 212 and the second raceway 242 and between the third raceway 244 and the fourth raceway 272, and retains the plurality of rolling members 300 such that the rolling members 300 are not dislodged from the raceways 212, 242, 244, and 272.

A front stopper 214 and a rear stopper 261 may protrude at positions forward and backward of the first raceway 212 of the fixed rail 210. In addition, a left front stopper 250 and a left rear stopper 252 may protrude at positions forward and backward of the second raceway 242 of the first movable rail 240. The front stopper 214 and the rear stopper 216 of the fixed rail 210 and the left front stopper 250 and the left rear stopper 252 of the first movable rail 240 protrude toward the routes along which the rolling members 300 move during rolling movement between the fixed rail 210 and the first movable rail 240. Here, the routes along which the rolling members 300 move indicate areas between the fixed rail 210 and the first movable rail 240 and between the first movable rail 240 and the second movable rail 270 in which the rolling members 300 roll when the slide apparatus operates.

The front stopper 214 and the rear stopper 216 formed on the fixed rail 210 and the left front stopper 250 and the left rear stopper 252 formed on the first movable rail 240 function to limit the distance the first movable rail 240 is withdrawn from and retracted into the fixed rail 210 while preventing the rolling members 300 from being dislodged from the raceways 212 and 242. When the first movable rail 240 is withdrawn from the fixed rail 210, the rolling members 300 interposed between the first raceway 212 and the second raceway 242 move forward along with the first movable rail 240 while performing rolling movement. Since the rolling members 300 move like a unified body with the distances thereof being maintained by the ball retainer 100, when the foremost rolling member 300 is caught by the front stopper 214 of the fixed rail 210 or the rearmost rolling member 300 is caught by the left rear stopper 252 of the first movable rail 240 during the withdrawal of the first movable rail 240, the rolling members 300 are stopped from advancing further, and consequently, the first movable rail 240 is not withdrawn any more. Thus, this point becomes the maximum withdrawal point of the first movable rail 240. The retraction of the first movable rail 240 is performed in a manner opposite to the withdrawal thereof. In the retraction of the first movable rail 240, the rolling members 300 interposed between the first raceway 212 and the second raceway 242 move backwards along with the first movable rail 240 while performing rolling movement. During the retraction of the first movable rail 240, the rearmost rolling member 300 is caught by the rear stopper 278 of the fixed rail 210 or the foremost rolling member 300 is caught by the left front stopper 250 of the first movable rail 240, the rolling members 300 are stopped from reversing further. Consequently, the first movable rail 240 cannot be retracted further. Thus, this point becomes the maximum retraction point of the first movable rail 240. Here, it is preferable that the front stopper 214 and the rear stopper 216 of the fixed rail 210 and the left front stopper 250 and the left rear stopper 252 of the first movable rail 240 are configured such that their projections in the longitudinal direction do not overlap each other in order to prevent the first movable rail 240 and the fixed rail 210 from interfering with each other during the movement of the first movable rail 240 with respect to the fixed rail 210.

In order to perform the same function as above, the third raceway 244 of the first movable rail 240 has a right front stopper 254 and a right rear stopper 256, and the fourth raceway 272 of the second movable rail 270 has a front stopper 276 and a rear stopper 278. The second movable rail 270 is withdrawn and retracted with respect to the first movable rail 240 in the same manner as the first movable rail 240 is withdrawn and retracted with respect to the fixed rail 210.

The configuration of the ball retainer 100 will now be described in detail with reference to FIGS. 2 and 3. The ball retainer 100 according to according to the embodiment of the present invention includes a first extension 120 and a second extension 130 extending from the centerline 110 in transverse directions, forming a predetermined angle therebetween. The ball retainer 100 includes a body section 140 formed in the central portion in the longitudinal direction and a pair of retaining sections 150 formed on both end portions of the body section 140 in the longitudinal direction. Each of the retaining sections 150 has ball accommodation recesses 160 formed therein, with which the retaining sections 150 serve to maintain the distances between the rolling members 300. The body section 140 serves to adjust the entire length of the ball retainer 100.

The first extension 120 and the second extension 130 extend to define the predetermined angle therebetween. Each of the first extension 120 and the second extension 130 has a plurality of ball accommodation recesses 160. Each of the ball accommodation recesses 160 is open downward, and each of the rolling members 300 is fitted into the corresponding ball accommodation recess 160 through the open portion and is accommodated in the corresponding ball accommodation recess 160. Although the rolling members 300 are illustrated as being accommodated in some of the ball accommodation recesses 160 for the sake of brevity, the rolling members 300 can be accommodated in the entire ball accommodation recesses 160.

The ball accommodation recesses 160 are spaced apart predetermined distances from each other in the longitudinal direction of the ball retainer 100. Here, as illustrated in FIG. 3, the ball accommodation recesses 160 formed in the first extension 120 and the ball accommodation recesses 160 formed in the second extension 130 may be staggered to each other in the longitudinal direction of the ball retainer 100. Specifically, in the first extension 120 and the second extension 130 arranged at the predetermined angle, the ball accommodation recesses 160 of the first extension 120 and the ball accommodation recesses 160 of the second extension 130 may be formed to alternate in the longitudinal direction such that, when the ball accommodation recesses 160 are formed in the portions of any one of the first extension 120 and the second extension 130, no ball accommodation recesses 160 are formed in the laterally-corresponding portions of the other one of the first extension 120 and the second extension 130. Since the ball accommodation recesses 160 are formed to meander in the longitudinal direction of the ball retainer 100 as above, the rolling members 300 accommodated in the ball accommodation recesses 160 are arranged in a distributed manner. Thus, load can be advantageously distributed without being concentrated on a specific ball among the plurality of rolling members 300 accommodated in the ball retainer 100. However, the arrangement of the ball accommodation recesses 160 in the retaining sections 150 is not limited thereto, and the ball accommodation recesses 160 may be arranged side by side in the transverse direction in the first extension 120 and the second extension 130. In addition, as illustrated in FIG. 3, the number of the ball accommodation recesses 160 formed in the first extension 120 is different from the number of the ball accommodation recesses 160 formed in the second extension 130. Alternatively, the number of the ball accommodation recesses 160 formed in the first extension 120 may be the same as the number of the ball accommodation recesses 160 formed in the second extension 130.

The body section 140 serves to adjust the entire length of the ball retainer 100. The entire length of the ball retainer 100 is one of factors that determines the movable lengths of the first movable rail 240 and the second movable rail 270, i.e. the length to which the first movable rail 240 can be withdrawn and retracted with respect to the fixed rail 210, and the length to which the second movable rail 270 can be withdrawn and retracted with respect to the first movable rail 240. For example, in the plurality of rolling members 300 interposed between the first raceway 212 and the second raceway 242, the greater the distance between the foremost rolling member 300 and the rearmost rolling member 300 is, the smaller the movable length of the first movable rail 240 becomes. In contrast, the smaller the distance between the foremost rolling member 300 and the rearmost rolling member 300 is, the greater the movable length of the first movable rail 240 becomes. Thus, even if the same number of rolling members 300 is interposed between the first raceway 212 and the second raceway 242, the movable length of the first movable rail 240 may vary depending on the distance between the foremost rolling member 300 and the rearmost rolling member 300. Here, since the distances of the rolling members 300 are determined by the ball retainer 100, the movable length of the first movable rail 240 is influenced by the length of the ball retainer 100. The longer the ball retainer 100 is, the shorter the movable length of the first movable rail 240 becomes. Thus, a designer can select the method of adjusting the length of the ball retainer 100 as one method of adjusting the length to which the first movable rail 240 is withdrawn. Even if the lengths of the retaining sections 150 are constant, when the length of the body section 140 is changed, the entire length of the ball retainer 100 is changed. The method of adjusting the length of the body section 140 instead of the retaining sections 150 in order the adjust the entire length of the ball retainer 100 leads to an advantage in that ball retainers 100 having several lengths can be fabricated using a single mold when a fabrication method of the ball retainers 100, which will be described later, is injection molding. The related details will be described later.

In addition, one or more expanded sections 170 are formed on each of both longitudinal ends of the ball retainer 100, the area of the expanded sections 170 expanding in the direction intersecting the longitudinal direction of the ball retainer 100, preferably, in the transverse direction of the ball retainer 100. The expanded sections 170 are respectively formed on the first extension 120 and the second extension 130. In the ball retainer according to the embodiment of the present invention, the expanded sections 170 perform three major functions.

Figure 7:
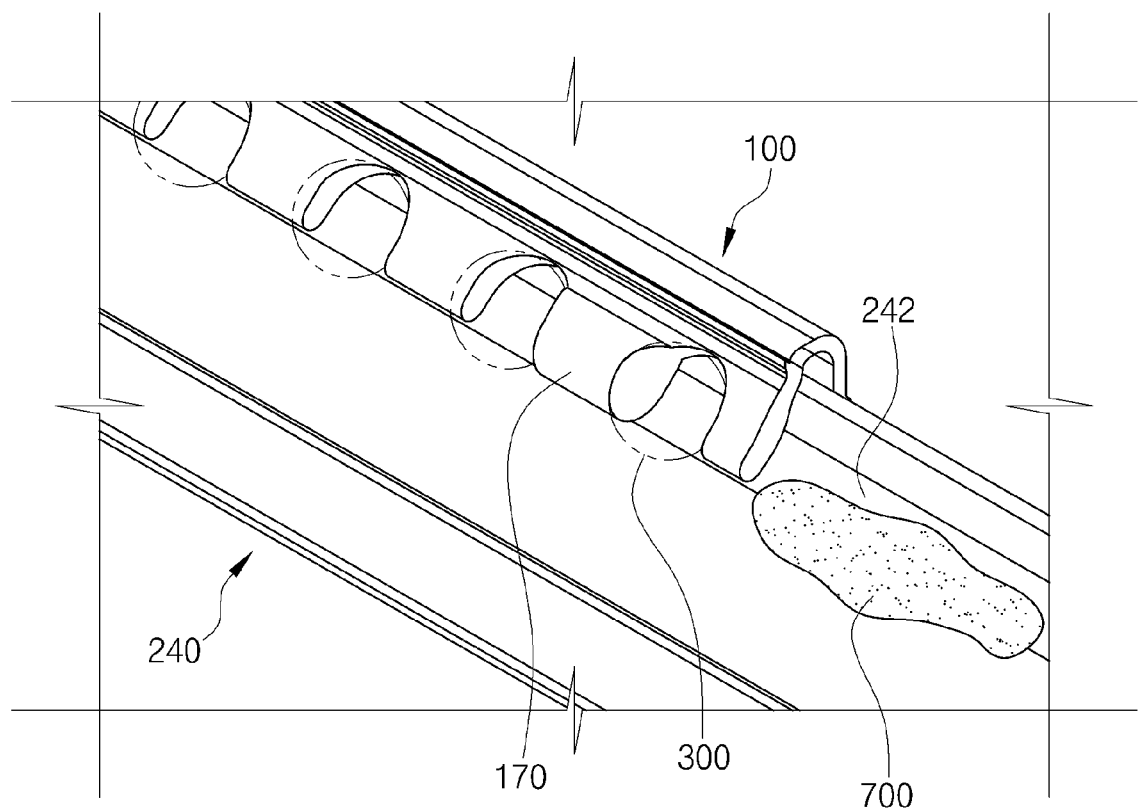
FIG. 7 is a view illustrating an example in which the ball retainer according to the embodiment of the present invention removes impurities that have entered a raceway.

First, as illustrated in FIG. 7, the expanded sections 170 serve to push impurities 700, such as dust or wood chips, out of the movement range of the rolling members 300, thereby preventing impurities 700 from entering the raceway 242. The cross-sectional area of each of the expanded sections 170 is greater than the cross-sectional area of each of the other portions of the first extension 120 and the second extension 130. When the slide apparatus operates, the ball retainer 100 reciprocally moves forwards and backwards. Impurities that have entered the raceways 212, 242, 244, and 272 during the reciprocal movement of the ball retainer 100 along the raceways 212, 242, 244, and 272 are pushed out of the movement range of the rolling members 300 by the expanded sections 170. Here, it is preferable that the cross-sectional shape of the expanded sections 170 is similar to the cross-sectional shape of the rolling members 300. Thus, when the rolling members 300 have the shape of balls, it is preferable that the expanded sections 170 have a circular cross-sectional shape. In addition, it is preferable that the shapes of the portions of the expanded sections 170 facing the raceways conform to the shape of the raceways in order to remove as much impurities as possible on the raceways without interfering with the raceways when the slide apparatus operates. Here, it is preferable that the expanded sections 170 are sized such that the expanded sections 170 can be spaced apart suitable distances, for example, about 0.5 mm, from the raceways in order to prevent the expanded sections from interfering with the raceways when the slide apparatus operates. When the expanded sections 170 are formed on the front ends and the rear ends of the first extension 120 and the second extension 130 of ball retainer 100, impurities that have entered the raceways 212, 242, 244, and 272 during the operation of the slide apparatus are pushed out of the movement range of the rolling members 300. Thus, the rolling members 300 can roll on the raceways 212, 242, 244, and 272 without being influenced by impurities.

In addition, the expanded sections 170 are disposed in the space between the first raceway 212 and the second raceway 242 and the space between the third raceway 244 and the fourth raceway 272, whereby the space between the expanded sections 170 disposed on one end of the ball retainer 100 and the expanded sections 170 disposed on the other end of the ball retainer 100 is separated and partitioned from the outside. Thus, substantially no impurities enter the space between the expanded sections 170 on one end and the expanded sections 170 on the other end of the ball retainer 100, whereby the contamination of lubricant applied on the raceways 212, 242, 244, and 272 by impurities is reduced to a minimum amount. This consequently prevents the endurance of the rails 210, 240, and 270 from decreasing. In addition, the expanded sections 170 function as a cover, thereby preventing lubricant applied on the raceways 212, 242, 244, and 272 from leaking out of the paths of the rolling members 300 or evaporating. This consequently prevents the other portions of the rails 210, 240, and 270 from being contaminated by lubricant. It is unnecessary to additionally apply lubricant on the raceways 212, 242, 244, and 272 during the period of use of the slide apparatus.

Figure 8:
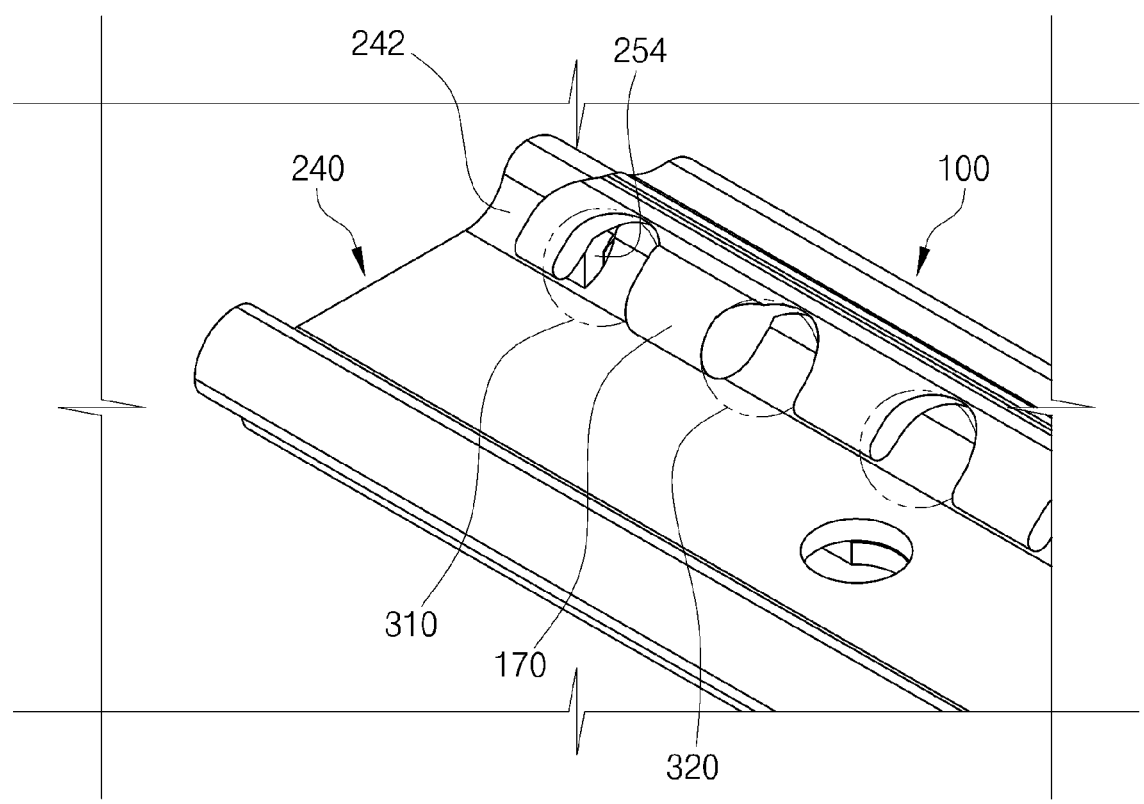
FIG. 8 is a view illustrating a position in which a ball retained by the ball retainer according to the embodiment of the present invention is caught by a stopper.

As another function of the expanded sections 170, when the first movable rail 240 or the second movable rail 270 cannot move forwards any further during the withdrawal or retraction since the foremost rolling member in the sliding direction of the first movable rail 240 or the second movable rail 270 is caught by the stopper, the expanded sections 170 serve to prevent the ball retainer 100 from moving over the rolling members 300. For example, referring to FIG. 8, when the second movable rail 270 is withdrawn to the maximum length in the forward withdrawal of the second movable rail 270 with respect to the first movable rail 240, the foremost rolling member 310 of the ball retainer 100 is caught by the right front stopper 254 of the first movable rail 240. In the case in which the ball retainer 100 does not have the expanded sections 170, when a user pulls the second movable rail 270 with excessively great force, even if the foremost rolling member 310 of the ball retainer 100 is caught and stopped by the stopper 254, the ball retainer 100 may move over the foremost rolling member 310, pushed by the other rolling members 320 at rear of the foremost rolling member 310 due to the force of inertia of the second movable rail 270. In contrast, when the expanded sections 170, the cross-section of which expands in the transverse direction, are provided, the area of the ball retainer 100 caught by the rolling members 300 is increased. Thus, when the user operates the slide apparatus with an excessive amount of force, the ball retainer 100 is prevented from moving over the rolling members 300.

As above, the ball retainer 100 is formed of a lightweight plastic. It is therefore possible to remove impurities that have entered the raceways, allowing the rolling members to roll, without increasing the overall weight of the slide apparatus. In addition, there is an effect that, even if the slide apparatus is operated with an excessive amount of force, it is possible to prevent the ball retainer from moving over the rolling members and the rolling members from being dislodged from the ball retainer.

Hereinafter, a mold for fabricating the ball retainer according to the present invention will be described.

Figure 9:
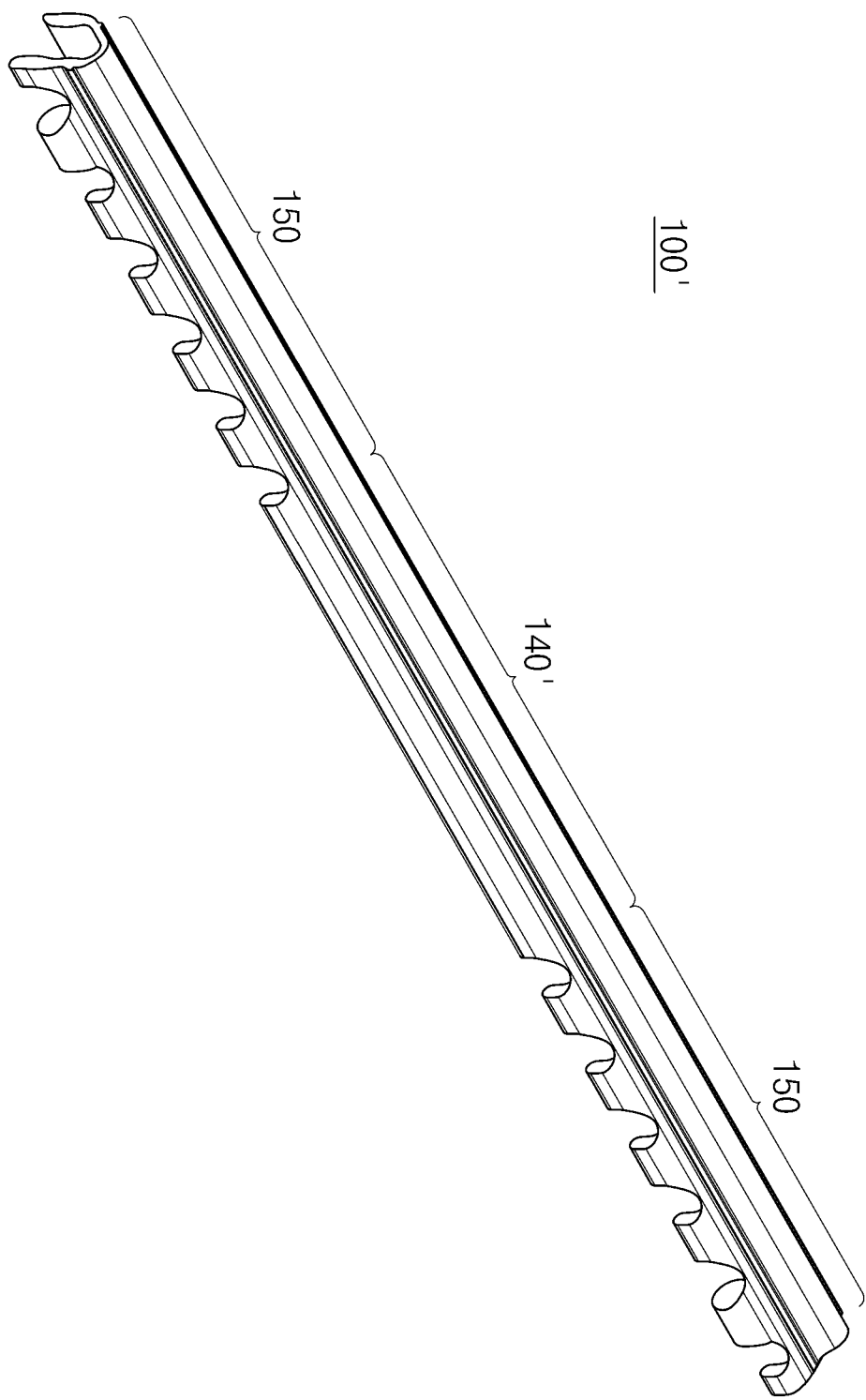
FIGS. 9 and 10 are perspective views illustrating ball retainers according to other embodiments of the present invention.
Figure 10:
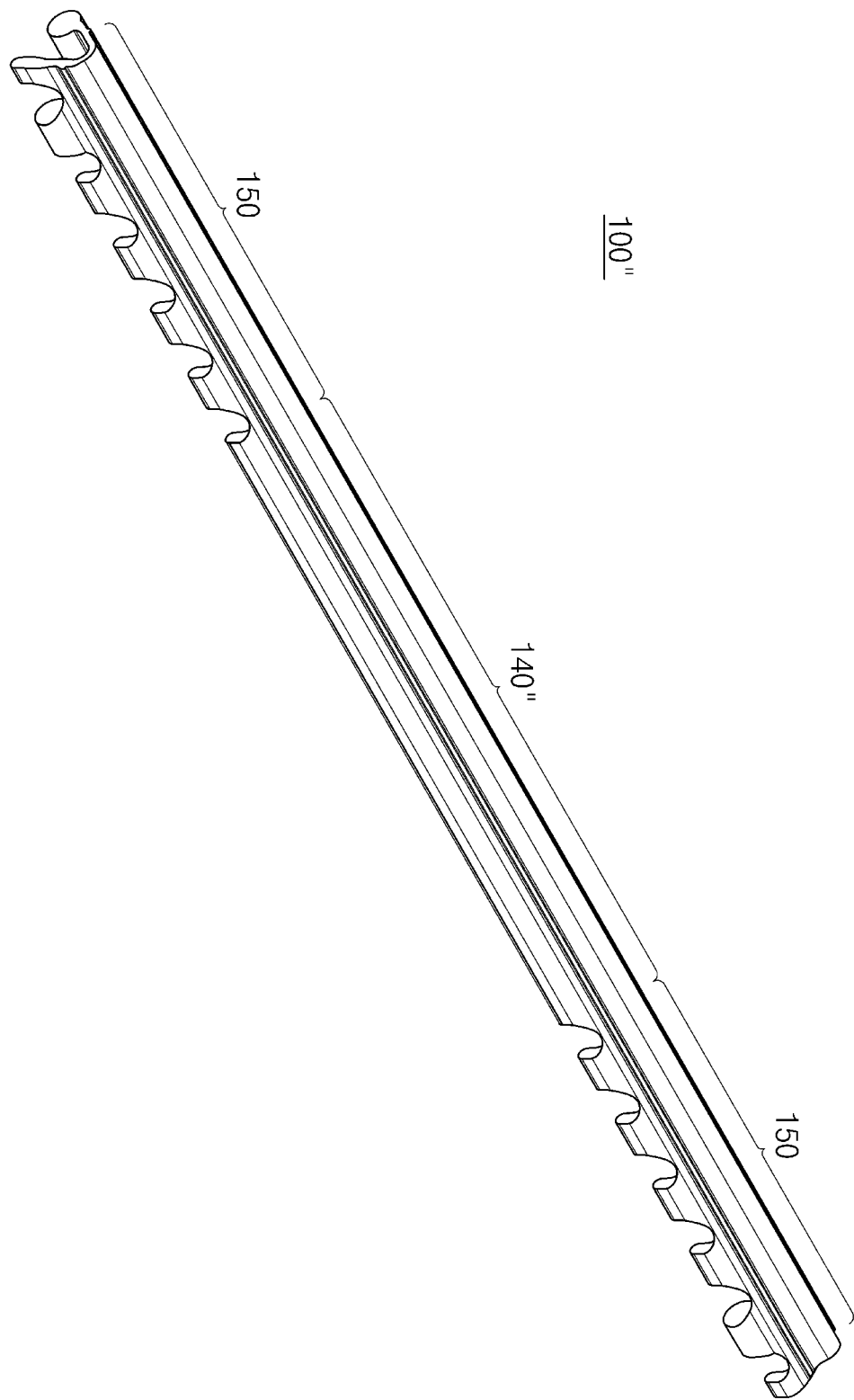

When the ball retainer according to the present invention is formed of plastic, the ball retainer can be fabricated by injection molding using a mold. FIGS. 9 and 10 are perspective views illustrating ball retainers according to other embodiments of the present invention. As illustrated in FIGS. 9 and 10, in various embodiments of the ball retainer according to the present invention, although the length of the retaining sections 150 is the same, body sections 140' or 140" may have a variety of lengths. Thus, when the ball retainer according to the invention is fabricated by injection molding, the length of the portion of the mold participating in determining the length of the body sections can be adjusted, whereby ball retainers having a variety of lengths of the body sections can be injection-molded using a single mold without using other molds.

Figure 11:
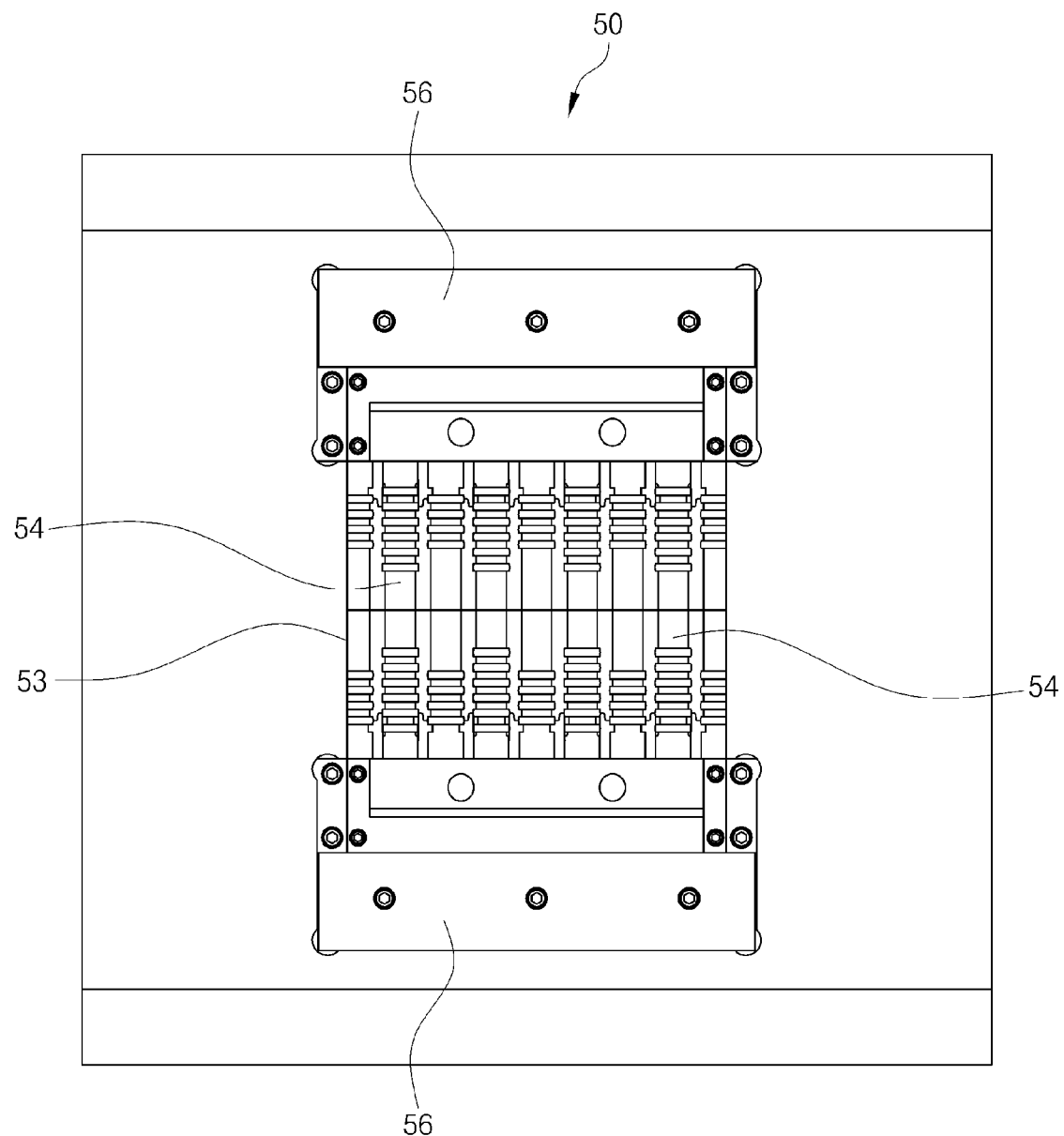
FIG. 11 is a view illustrating an embodiment of a mold for fabricating a ball retainer according to the present invention.
Figure 12:
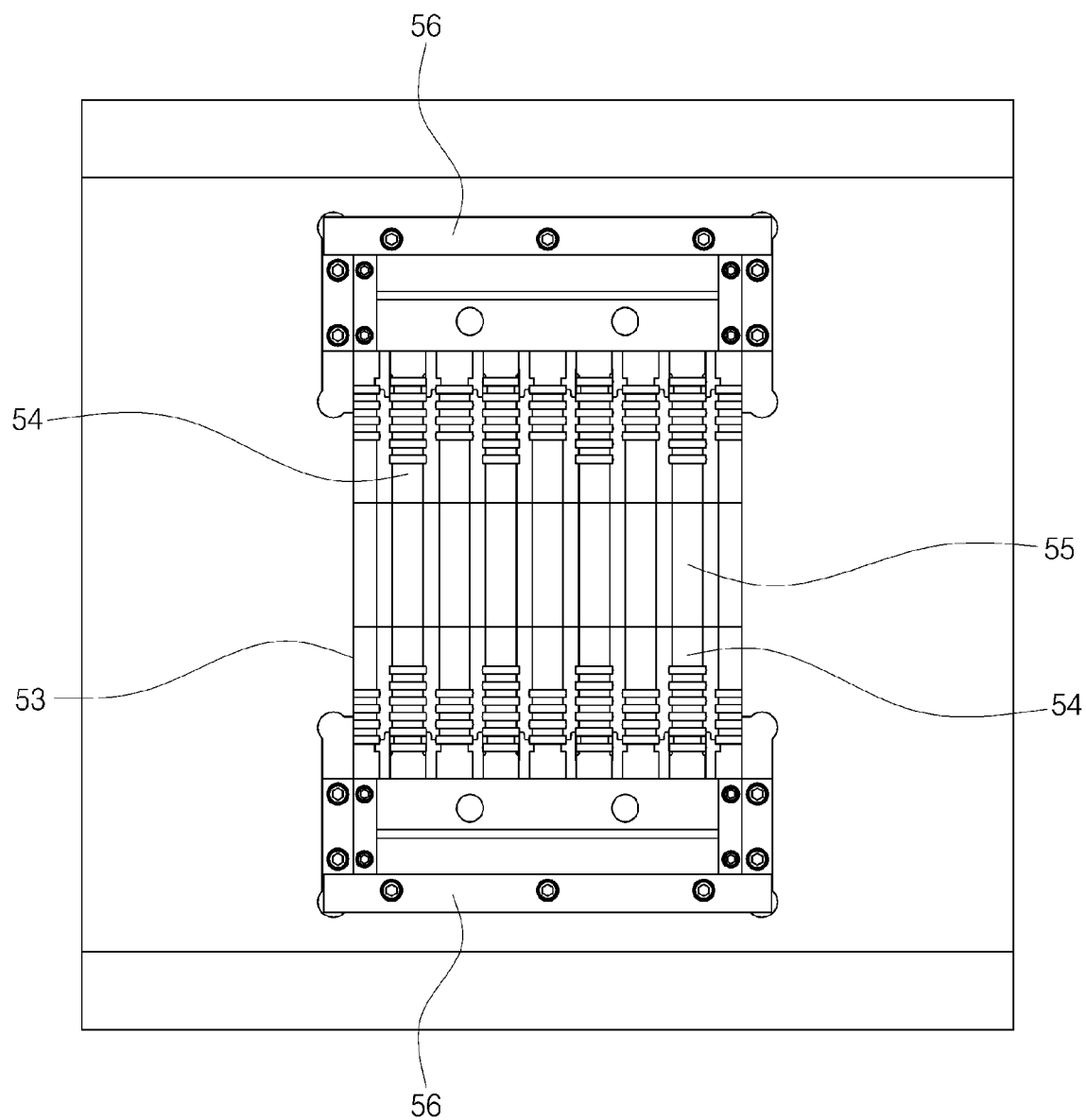
FIG. 12 is a view illustrating an embodiment of a mold for fabricating a ball retainer having a body, the length of which is different from the length of the body of the ball retainer fabricated by the mold illustrated in FIG. 11.

FIG. 11 is a view illustrating an embodiment of a mold for fabricating a ball retainer according to the present invention, and FIG. 12 is a view illustrating an embodiment of a mold for fabricating a ball retainer having a body, the length of which is different from the length of the body of the ball retainer fabricated by the mold illustrated in FIG. 11.

Referring to FIGS. 11 and 12, the mold 50 for fabricating the ball retainer according to the present invention includes a first mold and a second mold. When the first mold and the second mold are coupled to each other, a cavity having the cross-sectional shape of the ball retainer is defined therebetween.

Each of the first and second molds has an accommodation space 53 having a predetermined shape. Pattern sections 54 and 55 for forming the cavity and side cores 56 for fixing the pattern sections 54 and 55 are accommodated in the accommodation space 53. The pattern sections 54 and 55 include the first pattern sections 54 for forming a cavity, the shape of which corresponds to the retaining sections 150 and the body section 140, and the second pattern section 55 for forming a cavity, the shape of which corresponds to the additional length portion of the body section.

A pair of first pattern sections 54 is accommodated in both sides of the accommodation space 53, and form cavity portions corresponding to the retaining sections 150 and the body section 140. The first pattern sections 54 are provided as one type. When the first mold and the second mold are coupled to each other, the first pattern sections 54 form the cavity, the shape of which corresponds to the shape of the retaining sections 150 and the body section 140. It is possible to fabricate the ball retainer according to the present invention using only the first pattern sections 54. At this time, the ball retainer 100 has a shortest body section that can be fabricated by the mold 50.

The second pattern section 55 is interposed between the pair of first pattern sections 54, and forms the cavity portion corresponding to the additional length of the body section 140. The second pattern section 55 is provided as a variety of types having different lengths as required by a designer. When the second pattern section 55 is interposed between the first pattern sections 54, the length of the body section 140 is increased by the length of the interposed section pattern section 55. Thus, it is possible to fabricate ball retainers having a variety of lengths equal to the number of types of the second pattern section 55.

The side cores 56 are accommodated in both ends of the first pattern sections 54 to fix the positions of the first pattern sections 54 and the second pattern section 55. That is, the side cores 56 occupy the remaining area, except for the first pattern sections 54 and the second pattern section 55, thereby fixing the first pattern sections 54 and the second pattern section 55 so as not to move. In the mold 50 according to the present invention, the length of the first pattern sections 54 is always constant, but the length of the second pattern section 55 may vary depending on the types of ball retainers to be fabricated. In some cases, the second pattern section 55 may not be provided. Thus, in the accommodation space 53 having a predetermined shape, different areas are occupied by the first pattern sections 54 and the second pattern 55 depending on the types of ball retainers to be fabricated. The side cores 56 are designed to correspond to the second pattern section 55 accommodated in the accommodation space 53 such that the side cores 56 fill the accommodation space 53. In other words, when a shorter second pattern section 55 is accommodated in the accommodation space 53, longer side cores 56 are disposed on both sides of the first pattern section 54. When a longer second pattern section 55 is accommodated in the accommodation space 53, shorter side cores 56 are disposed on both sides of the first pattern section 54.

As such, the first pattern sections 54 are provided as a single type having a fixed length, but the second pattern section 55 and the side cores 56 are provided in different lengths. Thus, it is possible to fabricate ball retainers, the body section 140 of which has various lengths, using the mold 50 having the single accommodation space 53.

Figure 13:
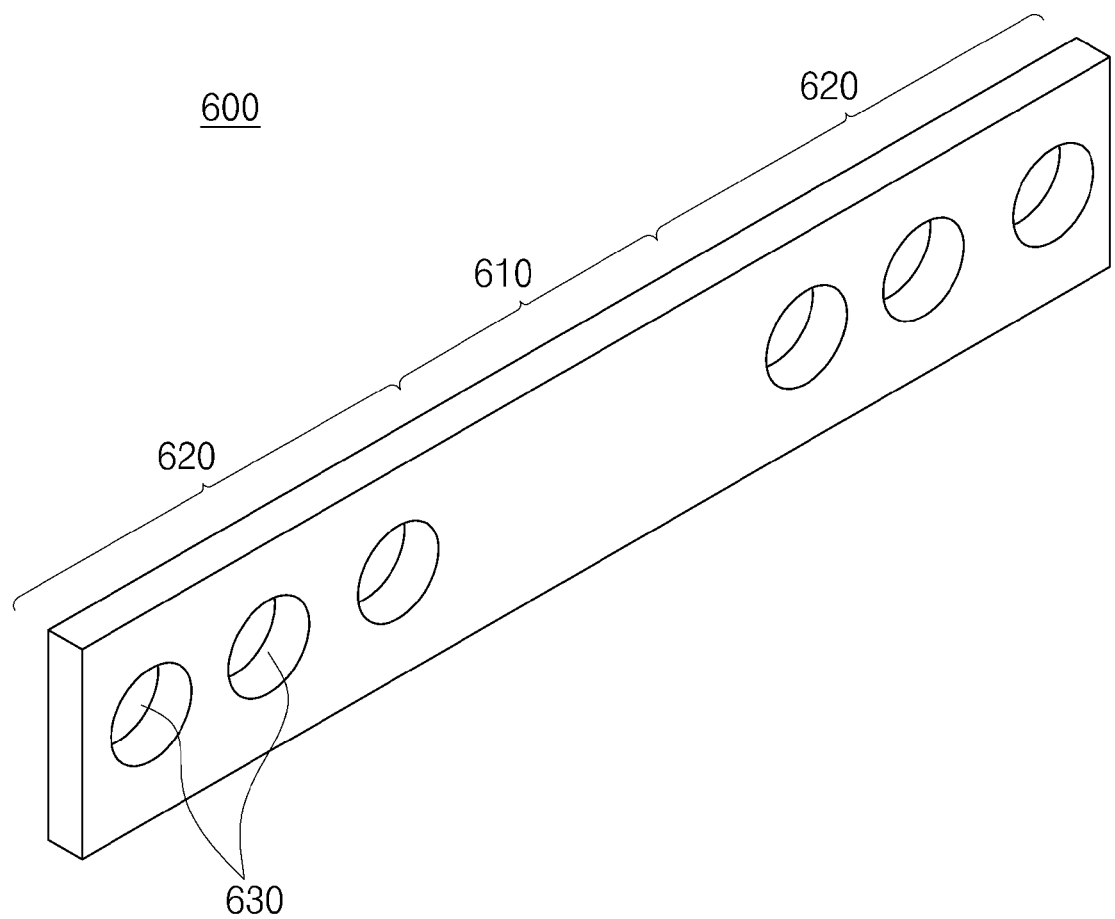
FIG. 13 is a view illustrating another shape of a ball retainer that can be fabricated by a mold for fabricating a ball retainer according to the present invention.

The ball retainer that can be fabricated using the mold for fabricating a ball retainer according to the present invention can have a variety of shapes that are not limited to the ball retainer shape illustrated in FIG. 2, 9 or 10. For example, FIG. 13 illustrates another shape of a ball retainer that can be fabricated by a mold for fabricating a ball retainer according to the present invention. The ball retainer 600 has the shape of an elongated plate, and includes a body section 610 in the central portion and retaining sections 620 disposed on both ends of the body section 610. The body section 610 of the ball retainer 600 serves to adjust the entire length of the ball retainer 600. Each of the retaining sections 620 has ball accommodation recesses 630 in which balls are to be accommodated, and serves to maintain the distances of the balls. According to the mold for fabricating a ball retainer according to the present invention as described above, ball retainers, the body section of which has a variety of lengths, can be fabricated. The specific shape of the ball retainer can be variously modified.

The foregoing descriptions and the accompanying drawings have been presented in order to explain the certain principles of the present invention. A person skilled in the art to which the present invention relates can make many modifications and variations without departing from the principle of the invention. The foregoing embodiments disclosed herein shall be interpreted as illustrative only but not as limitative of the principle and scope of the invention. It should be understood that the scope of the invention shall be defined by the appended Claims and all of their equivalents fall within the scope of the invention.

The invention claimed is:

1. A ball retainer comprising:
a body section formed in a central portion in a longitudinal direction; and
a pair of retaining sections formed on both ends of the body section, each of the retaining sections having a plurality of ball accommodation recesses in which balls are accommodated, the ball accommodation recesses being spaced apart in the longitudinal direction,
wherein the body section and the pair of retaining sections are defined by a first extension and a second extension extending from a centerline in transverse directions to the centerline extending in the longitudinal direction, the first extension and the second extension forming a predetermined angle therebetween; and
wherein each of the first extension and the second extension has expanded sections on both sides thereof in the longitudinal direction, a cross-sectional area of each of the expanded sections being greater than a cross-sectional area of a corresponding one of the first extension and the second extension, and a cross-sectional shape of each of the expanded sections is the same as a cross-sectional shape of the balls.

2. The ball retainer according to claim 1, wherein the plurality of ball accommodation recesses define U-shaped cutouts in terminal ends defining each of the first extension and the second extension extending in the longitudinal direction.

3. The ball retainer according to claim 1, wherein the cross-sectional area of each of the expanded sections being greater than a cross-sectional area of a corresponding one of the first extension and the second extension with respect to both opposing surfaces extending in the longitudinal direction defining the corresponding one of the first extension and the second extension.

4. The ball retainer according to claim 1, wherein the cross-sectional area of each of the expanded sections is substantially concentrically aligned with a cross-sectional area of the balls disposed in a corresponding retaining section of the pair of retaining sections.

5. The ball retainer according to claim 1, wherein the plurality of ball accommodation recesses in the first extension alternate with the plurality of ball accommodation recesses in the second extension with respect to the longitudinal direction.

6. A mold for fabricating the ball retainer as claimed in claim 5, the mold comprising:
a first mold and a second mold, in each of which an accommodation space having a predetermined shape is formed;
a pair of first pattern sections accommodated the accommodation spaces to form a cavity having a shape corresponding to the retaining sections and the body section;
a second pattern section interposed between the pair of first pattern sections in the accommodation space to form a cavity having a shape corresponding to an additional length portion of the body section; and
a pair of side cores accommodated in both ends of the first pattern sections of the accommodation space to occupy a remaining area in the accommodation space, except for areas occupied by the first pattern sections and the second pattern section, thereby fixing the first pattern sections and the second pattern section so as not to move.

7. A mold for fabricating the ball retainer as claimed in claim 1, the mold comprising:
a first mold and a second mold, in each of which an accommodation space having a predetermined shape is formed;
a pair of first pattern sections accommodated the accommodation spaces to form a cavity having a shape corresponding to the retaining sections and the body section;
a second pattern section interposed between the pair of first pattern sections in the accommodation space to form a cavity having a shape corresponding to an additional length portion of the body section; and
a pair of side cores accommodated in both ends of the first pattern sections of the accommodation space to occupy a remaining area in the accommodation space, except for areas occupied by the first pattern sections and the second pattern section, thereby fixing the first pattern sections and the second pattern section so as not to move.

8. A slide apparatus comprising:
a fixed rail fixed to a fixed part, and having a first raceway;
a first movable rail having a second raceway formed in a position corresponding to the first raceway, being slidably coupled to the fixed rail, and having a third raceway;
a second movable rail fixed to a movable part, having a fourth raceway formed in a position corresponding to the third raceway, and being slidably coupled to the first movable rail;
a plurality of rolling members interposed between the first raceway and the second raceway and between the third raceway and the fourth raceway such that the plurality of rolling members can roll; and
a ball retainer interposed between the first raceway and the second raceway and between the third raceway and the fourth raceway to maintain distances between the rolling members,
wherein the ball retainer comprises:
a body section formed in a central portion in a longitudinal direction; and
a pair of retaining sections formed on both ends of the body section, each of the retaining sections having a plurality of ball accommodation recesses in which balls are accommodated, the ball accommodation recesses being spaced apart in the longitudinal direction,
wherein the body section and the pair of retaining sections are defined by a first extension and a second extension extending from a centerline in transverse directions to the centerline extending in the longitudinal direction, the first extension and the second extension forming a predetermined angle therebetween; and
wherein each of the first extension and the second extension has expanded sections on both sides thereof in the longitudinal direction, a cross-sectional area of each of the expanded section being greater than a cross-sectional area of a corresponding one of the first extension and the second extension, and a cross-sectional shape of each of the expanded sections is the same as a cross-sectional shape of the balls.

9. The slide apparatus according to claim 8, wherein the plurality of ball accommodation recesses define U-shaped cutouts in terminal ends defining each of the first extension and the second extension extending in the longitudinal direction.

10. The slide apparatus according to claim 8, wherein the cross-sectional area of each of the expanded sections being greater than a cross-sectional area of a corresponding one of the first extension and the second extension with respect to both opposing surfaces extending in the longitudinal direction defining the corresponding one of the first extension and the second extension.

11. The slide apparatus according to claim 8, wherein the cross-sectional area of each of the expanded sections is substantially concentrically aligned with a cross-sectional area of the balls disposed in a corresponding retaining section of the pair of retaining sections.

12. A mold for fabricating the ball retainer as claimed in claim 8, the mold comprising:
a first mold and a second mold, in each of which an accommodation space having a predetermined shape is formed;
a pair of first pattern sections accommodated the accommodation spaces to form a cavity having a shape corresponding to the retaining sections and the body section;

a second pattern section interposed between the pair of first pattern sections in the accommodation space to form a cavity having a shape corresponding to an additional length portion of the body section; and a pair of side cores accommodated in both ends of the first pattern sections of the accommodation space to occupy a remaining area in the accommodation space, except for areas occupied by the first pattern sections and the second pattern section, thereby fixing the first pattern sections and the second pattern section so as not to move.

* * * * *